United States Patent
Ezhov et al.

[15] 3,678,554
[45] July 25, 1972

[54] PROFILE FLAT TOOTH MILLING CUTTER

[72] Inventors: Leonid Antipovich Ezhov; Yankel Veniaminovich Kudevitsky; Ljudmila Bavlovna Belyaeva, all of Leningrad, U.S.S.R.

[73] Assignee: Leningradsky Metallichesky Zavod Imeni XXII Slezda KPSS, Leningrad, U.S.S.R.

[22] Filed: April 27, 1970

[21] Appl. No.: 32,033

[52] U.S. Cl. ............................................................29/103
[51] Int. Cl. ....................................................B26d 1/12
[58] Field of Search .....................29/103, 103 A, 103 B

[56] References Cited

UNITED STATES PATENTS

| | | | |
|---|---|---|---|
| 3,371,396 | 3/1968 | Johnson | 29/103 |
| 1,601,019 | 9/1926 | Hoagland | 29/103 |
| 66,354 | 7/1867 | Keables | 29/103 |
| 1,995,290 | 3/1935 | Bazzoni | 29/103 X |
| 1,815,324 | 7/1931 | Olson | 29/103 X |
| 1,443,64 | 1/1923 | Muller | 29/103 |
| 1,429,618 | 9/1922 | Muller | 29/103 |
| 1,348,295 | 8/1920 | Muller | 29/103 |

FOREIGN PATENTS OR APPLICATIONS

| | | | |
|---|---|---|---|
| 775,434 | 5/1957 | Great Britain | 29/103 |

*Primary Examiner*—Harrison L. Hinson
*Attorney*—Waters, Roditi, Schwartz & Nissen

[57] ABSTRACT

The present invention relates to cutting tools, and more specifically to a flat tooth profile milling cutter one end of the cutting edge of which is located closer to the milling cutter rotation axis than the other points of this cutting edge.

The milling cutter can be most efficiently used, according to the invention, for machining curvilinear surfaces of vanes of steam and gas turbines, chip grooves of taps, and other cutting tools.

According to the invention each tooth of the milling cutter is inclined with respect to the milling cutter rotation axis at the same angle of 15–45°, as a result of which the rank angles of each tooth along its cutting edge, in planes normal to the cutting edge profile are positive.

3 Claims, 10 Drawing Figures

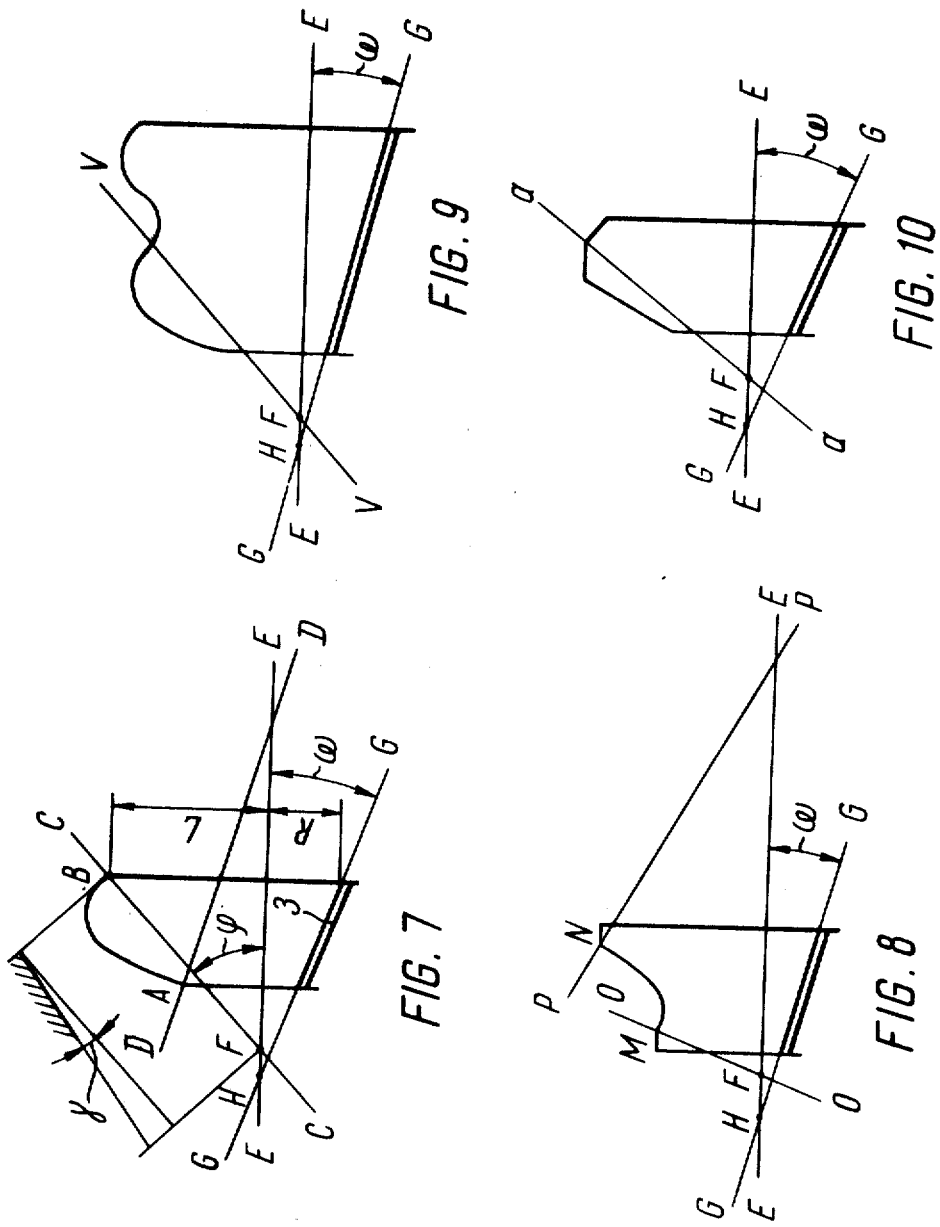

PROFILE FLAT TOOTH MILLING CUTTER

The present invention relates to cutting tool, and more specifically to a flat tooth profile milling cutter, one end of the cutting edge of which is closer to the milling cutter rotation axis, than the other points of this cutting edge.

The milling cutter can be most efficiently used, according to the invention, for machining curvilinear surfaces of vanes of steam and gas turbines, chip grooves of taps, and other cutting tools.

In the profile milling cutters of conventional use in every pair of adjacent teeth one of the teeth is inclined towards the face of the milling cutter at an acute angle whereas the other tooth is inclined at an obtuse angle so as to obtain positive cutting edge angles throughout the entire cutting edge of the tooth, laying in planes normal to the tooth cutting edge. To exclude negative cutting edge angles the teeth, set at an obtuse angle to every face of the milling cutter, are provided with bevels running about the middle of the tooth cutting edge (see, for example, British Pat. No. 775,434 cl.83(3) of 1957).

It is obvious that it is difficult to make a milling cutter with teeth set at different angles to the milling cutter rotation axis and that it is necessary to introduce an additional operation to make the bevels.

The productivity of this milling cutter is relatively small as the curvilinear surface profile of the machined part is formed only after the interaction of the part with a pair of teeth inclined at different angle to the milling cutter rotation axis. The grinding of milling cutter teeth up to their cutting edge is difficult and the milling cutter is to be set twice and that is why the thickness of the metal layer being removed may not be the same for teeth with different inclination with respect to the milling cutter rotation axis; the milling cutter profile, and, consequently, the profile of the surface of the part being machined are distorted (the milling cutter profile means the trace left by the cutting edges of the teeth on a plane passing through the milling cutter rotation axis; the milling cutter profile should correspond with the required profile of the surface of the part being machined.

The grinding of flanks of milling cutter teeth with different inclination, is also difficult.

The object of the present invention is to avoid the above said difficulties.

The object of the invention is to provide a profile milling cutter with flat teeth having positive cutting edge angles along the entire length of the cutting edge in planes normal to the cutting edge, the inclination of the milling cutter teeth with respect to the milling cutter rotation axis being the same.

According to the invention this is achieved because every tooth of the milling cutter is inclined with respect to the milling cutter rotation axis at an angle of 15°–45°, and the intersection point of the milling cutter rotation axis with an imaginary plane, aligned with the tooth cutting edge is placed farther from the milling cutter than the intersection point with this axis of another imaginary plane, normal at any point of the milling cutter profile.

It is expedient to incline every tooth of the milling cutter at an angle of 25°–30° with respect to the milling cutter rotation axis to ensure high efficiency and resistance of the milling cutter when working parts of chromium steel of the following composition (weight per cent): chromium 11–13, carbon 0.1–0.25, molybdenum 0.7, vanadium 0.3, and with a Brinell hardness of 125–250 kg/sq.mm.

It is preferable to manufacture the milling cutter, according to the invention, by making both wide and narrow teeth, which are set in turn, with each cutting edge end of every tooth, being farther from the rotation axis than its other end, located in the same plane, perpendicular to the milling cutter rotation axis, which increases the thickness of the metal layer cut off by sharp sections of the milling and increases the resistance of cutting edges of the milling cutter.

It is not less expedient for convex cutters to make at the bottom of every chip groove, adjoining the front edge of the narrow tooth, at the end of the tooth cutting edge, located closer to the milling cutter rotation axis than the other end of this edge, a section, removed farther from the milling cutter rotation axis than the bottom sections of other chip grooves placed at the same distance from the faces of this milling cutter. This makes it possible to make on the milling cutter the wide and the narrow teeth of equal strength throughout the entire length of each of them.

The essential advantage of the present invention is in the fact that as compared to the milling cutters of conventional use the efficiency with the same service of life between the resharpening is increased by at least twice as much. Besides, the sharpening of teeth is more simple along the rear and the front edges and the service life of the milling cutter is prolonged.

The following detailed description of preferable embodiments to make the milling cutter, according to the invention, is given with reference to the accompanying drawings wherein:

FIG. 7 is a sketch explaining the selection of the position of the milling cutter convex profile tooth slanting with respect to the milling cutter rotation axis;

FIG. 8 is a sketch explaining the selection of the position of the milling cutter concave profile tooth slanting with respect to the milling cutter rotation axis;

FIG. 9 is a sketch explaining the selection of the position of the milling cutter complex profile tooth slanting with respect to the milling cutter rotation axis;

FIG. 10 is a sketch explaining the selection of the position of the milling cutter broken line profile tooth slanting with respect to the milling cutter rotation axis.

Figure 3:
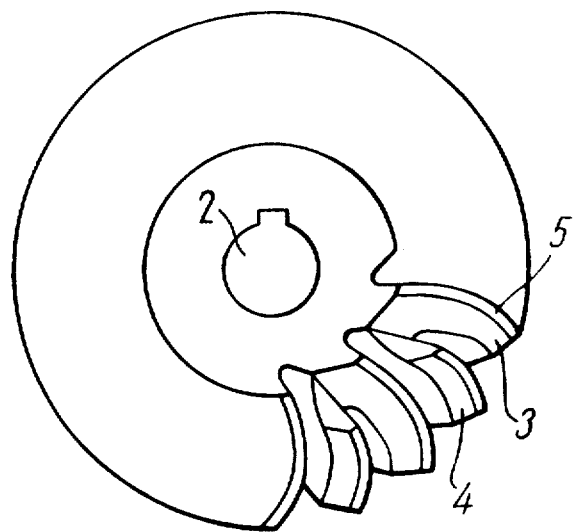
FIG. 3 is a side view of the milling cutter with a convex tooth profile.

The profile milling cutter is a monolithic disc 1 (FIGS. 1–3) with aperture 2 for securing in the machinetool. The disc carries flat teeth 3 and 4 (with flat front edge) slanting with respect to the milling cutter rotation axis at one and the same angle of ω, which is equal to 15°–45° which makes it possible to grind the milling cutter teeth both along the rear and the front edge and prolongs the milling cutter service life as well as increases the teeth strength.

The value of angle ω of tooth inclination with respect to the milling cutter axis is selected depending on the material being machined. The tooth inclination angle is to be equal 25°–30° when machining parts of chromium steel.

The milling cutter carries wide teeth 3 and narrow teeth 4 which are set in turn.

Figure 1:
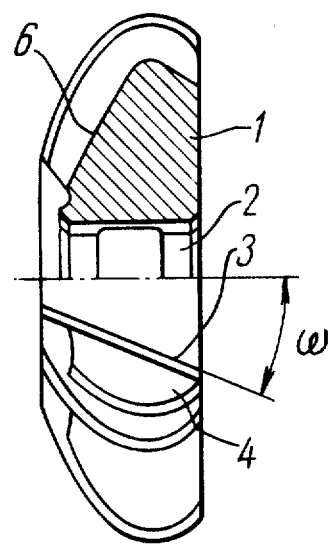
FIG. 1 shows a milling cutter with a convex tooth face, partially cut away along the chip groove adjoining the front edge of the wide tooth.
Figure 2:
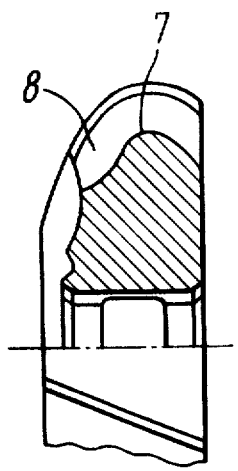
FIG. 2 is the same, partially cut away along the chip groove adjoining the front edge of the narrow tooth.

Between wide teeth there may be located one or several narrow teeth, the analogous ends of the cutting edges of narrow and wide teeth being in the same plane, perpendicular to the milling cutter rotation axis (in FIGS. 1 and 2 it is the right hand side face of the milling cutter). The presence of narrow and wide teeth makes it possible to increase the thickness of the cut off layer of the part by closed sections of the tooth profile and increase the durability of the milling cutter cutting edge. The rear surface of each tooth has chamfer 5, the inclination of which determines the clearance angle of the tooth. The bottom of chip groove 6 (FIG. 1), adjoining the front edge of the wide tooth, and the bottom of chip groove 7 (FIG. 2), adjoining the front edge of the narrow tooth, are made curvilinear with different profiles. The bottom of groove 7 at the end of the cutting edge, which is closer to the milling cutter rotation axis than the other end of this cutting edge, has section 8 which is located farther from the milling cutter rotation axis than the section of groove 6, placed at the same distance from the analogous face of the milling cutter. Such form and position of groove 7 provides for a uniform strength of the convex profile tooth of the milling cutter throughout its length. As a result of this the milling efficiency increases by not less than twice as much and the service life of the cutting miller grows.

Figure 4:
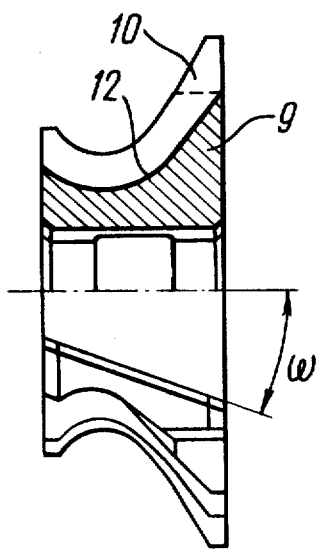
FIG. 4 is a milling cutter with a concave tooth profile, partially cut away along the chip groove adjoining the front edge of the wide tooth.
Figure 6:
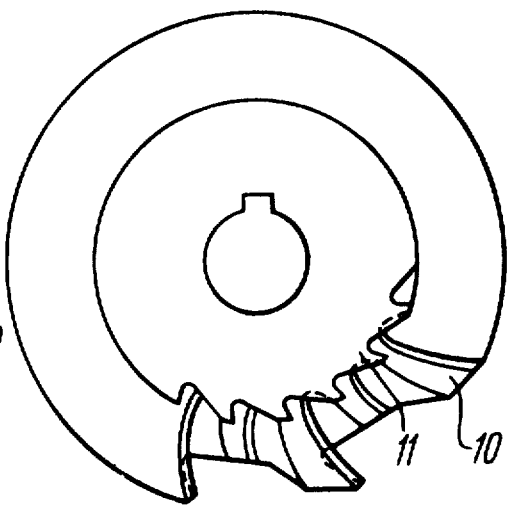
FIG. 6 is a side view of the milling cutter with a concave tooth profile.
Figure 5:
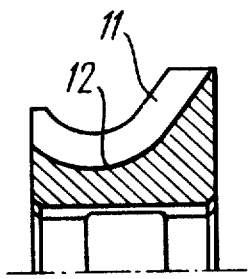
FIG. 5 is the same, partially cut away along the chip groove adjoining the front edge of the narrow tooth.

Monolithic disc 9 (FIGS. 4–6) of the profile milling cutter with a concave tooth profile carries wide teeth 10 which are set in turn with narrow teeth 11, the same as in the case of milling cutter with a convex tooth face. But, in the bottom of every chip groove 12 is of one and the same profile. Both the wide teeth and the narrow teeth are inclined at one and the same angle of $\omega$, which is equal to 15°–45° with respect to the milling cutter rotation axis.

The position of the inclined tooth for the convex profile milling cutter is determined in the following way. Drawn through points of profile AB (FIG.7) of the milling cutter are a number of perpendiculars CC, DD,etc. (not shown in the drawing) which are essentially traces of imaginary planes, normal with respect to the milling cutter profile.

Selected among these perpendiculars is the one that crosses the milling cutter rotation axis EE at point F,the farthermost from the milling cutter from the side of intersection of this axis E E by line GG,aligned with the front edge of tooth 2 of the milling cutter.To make rake angle $\gamma$ of cutting positive throughout the whole length of the tooth cutting edge it is necessary that point H of intersection of line GG with the milling cutter rotation axis E E be positioned from the milling cutter farther than point F.

The following formula meets this requirement:

$$\frac{L}{tg\rho} < \frac{R}{tg\omega},$$

where:

L — is the milling cutter profile radius at point B, $\rho$ — is the angle between perpendicular CC to profile AB at point B and milling cutter rotation axis EE;

R — is a distance between rotation axis EE of the milling cutter and the trace of intersection of the front edge of the tooth with the plane normal to the said axis and passing through the point B.

When line GG,aligned with the front edge,intersects the milling cutter rotation axis EE at point H, the rake angle is always positive at any value of angle $\omega$ of the tooth inclination with respect to the milling cutter axis.

For a milling cutter with a concave tooth profile angle $\omega$ is determined in the same way as that for a milling cutter with a convex tooth profile (FIG. 7). A number of perpendiculars OO,PP, etc. are drawn to profile MN (FIG. 8) (not shown in the drawing),among which is selected the one which intersects the milling cutter rotation axis EE at the point farthermost from the milling cutter on the side of intersection of this axis EE by line GG,aligned with the front edge of the milling cutter tooth. To make the rake angle positive throughout the cutting edge of the tooth it is necessary that the point H of the intersection of the line with the milling cutter rotation axis EE be positioned from the milling cutter farther than point F.

FIG. 9 shows a diagram of determining the position of the inclined tooth for a complex profile milling cutter. The determination principle is the same as that for a milling cutter with a convex tooth profile.

In this case perpendicular VV to the complex profile of the milling cutter is the only perpendicular which intersects the milling cutter rotation axis EE at the point F farthermost from the milling cutter on the side of intersection of this axis with line GG aligned with the front edge of the milling cutter tooth. To make the rake angle positive throughout the cutting edge of the tooth it is necessary that point H of the intersection of line GG with the milling cutter rotation axis EE be placed further from the milling cutter than point F.

FIG.10 shows a diagram of determining the position of the inclined tooth for a broken line tooth profile milling cutter.For this purpose,the same as in the previous case (FIG. 9) the perpendicular aa intersects the milling cutter rotation axis EE at point F,farthermost from the milling cutter.

In this case point H of the intersection of line GG, aligned with the front edge of the tooth,with the milling cutter rotation axis EE is farther from the milling cutter than point F.

It is obvious that the milling cutter can be made as a grouped cutter mill.

What is claimed is:

1. A profile milling cutter comprising a plurality of flat cutting teeth, each said tooth having one end of the cutting edge thereof located closer to the milling cutter rotational axis than the other points of the cutting edge, each said tooth of said milling cutter being inclined relative to the milling cutter rotational axis at an angle within the range of 15°–45°, the point of intersection of said rotational axis with an imaginary plane extending in alignment with the front edge of said tooth being located farther from the milling cutter than the point of intersection of the rotational axis with another imaginary plane which extends normal to any point of said milling cutter, said plurality of teeth including wide teeth and narrow teeth which extend about said cutter periphery in alternative relationship, the end of said cutting edge of each said tooth positioned farther from the rotational axis of said milling cutter than the other tooth end being located in the same plane extending perpendicular to said rotational axis.

2. The milling cutter according to claim 1 for machining parts of steel containing (weight per cent) 11–13 per cent of chromium, 0.1–0.25 per cent of carbon, 0.7 per cent of molibdenum, 0.3 per cent of vanadium,and having Brinell hardness of 125–250 kg/sq.mm,wherein each said tooth is inclined with respect to said rotation axis of this milling cutter at an angle of 25°–30.

3. The milling cutter, according to claim 1, with convex profile wherein,the bottom of each chip groove, adjoining the front edge of said narrow tooth at the end of the cutting edge positioned closer with respect to said rotation axis of said milling cutter than the other end of this cutting edge,has a section located farther from said rotation axis than bottom sections of other chip grooves located at the same distance from the faces of this milling cutter.

* * * * *

UNITED STATES PATENT OFFICE
CERTIFICATE OF CORRECTION

Patent No. 3,678,554                    Dated July 25, 1972

Inventor(s) Leonid Antipovich Ezhov, et al

It is certified that error appears in the above-identified patent and that said Letters Patent are hereby corrected as shown below:

On the cover sheet [72] the name of the third inventor "Ljudmila Bavlovna Belyaeva" should read -- Ljudmila Pavlovna Belyaeva --.

Signed and sealed this 19th day of December 1972.

(SEAL)
Attest:

EDWARD M. FLETCHER, JR.                 ROBERT GOTTSCHALK
Attesting Officer                       Commissioner of Patents